United States Patent [19]

Mortensen

[11] 4,197,885

[45] Apr. 15, 1980

[54] DIRECT CRANKING STARTER DEVICE

[75] Inventor: Harold R. Mortensen, Horseheads, N.Y.

[73] Assignee: Facet Enterprises, Inc., Tulsa, Okla.

[21] Appl. No.: 886,009

[22] Filed: Mar. 13, 1978

[51] Int. Cl.[2] ........................ F02N 15/00; F16D 41/06

[52] U.S. Cl. ........................................... 192/42; 74/6; 74/9; 192/45; 192/54; 192/55

[58] Field of Search ........................ 192/42, 45, 54, 55; 74/6, 7 R, 7 A, 9

[56] References Cited

U.S. PATENT DOCUMENTS

| | | | |
|---|---|---|---|
| 1,196,156 | 8/1916 | Savidge | 192/42 X |
| 2,075,078 | 3/1937 | Allen | 192/55 X |
| 2,398,261 | 4/1946 | Stone | 192/45 |
| 2,455,328 | 11/1948 | Buxton | 74/7 A X |
| 4,020,935 | 5/1977 | Mortensen | 74/6 |

*Primary Examiner*—Allan D. Herrmann
*Attorney, Agent, or Firm*—Remy J. Van Ophem

[57] ABSTRACT

A direct cranking starter device for an internal combustion engine has a rotatable driving member to be connected to a starting motor and an overrunning clutch for engaging the driving member to the crankshaft of the engine with a movable shock absorbing member interposed between the driving member and overrunning clutch to prevent initial starting torque intermittent shock loads generated upon initial activation of the starting motor from being transmitted through the driving member to the overrunning clutch.

8 Claims, 2 Drawing Figures

DIRECT CRANKING STARTER DEVICE

BACKGROUND OF THE INVENTION

The present invention relates to clutches and power-stop controls, and more particularly to starter drive devices of the fixed speed release type.

Various types of starter devices are known. One type, for example, has a pinion gear which engages the ring gear of the fly wheel of an engine when a starting motor is activated to start the engine. Starter devices of this type are typically noisy because the pinion gear must first mesh with the ring gear to crank the engine. Furthermore, the teeth on the pinion and ring gears are subject to breaking.

An example of another known starter device is shown in U.S. Pat. No. 4,020,935 issued on May 3, 1977, to Harold R. Mortensen, the inventor of the present invention. This starter device includes a driven member attached to the crankshaft of an engine for rotation with the crankshaft and a driving member connected to the engine starting motor. The driving member has a driving clutch element connected through a shock absorbing element to the driving member. Both the driving clutch element and the driven member have mating dentils which mutually engage below a predetermined engine speed and disengage at higher engine speeds. The disengagement is affected by means of throwout weights under the influence of the centrifugal forces produced by the engine after it has started, which move against the driven member. The shock absorbing element cushions the initial starting torque generated by the starting motor. This starter device is effective and quieter than those previously known.

SUMMARY OF THE INVENTION

The present invention is an improvement to my starter device of U.S. Pat. No. 4,020,935 in that it is even quieter, less expensive, smaller in physical size and eliminates any potential problem associated with the meshing and unmeshing of teeth.

More particularly, the present invention provides a direct cranking starter device to interconnect a starting motor and an internal combustion engine for starting the internal combustion engine and having a driving means to be operatively connected to the starting motor and to be rotatably driven by the starting motor, an overrunning clutch attached to the crankshaft of the engine to be started, and means for rotatably interconnecting the driving means and the overrunning clutch and for absorbing initial starting torque intermittent shock loads, whereby the overrunning clutch releasably and selectively drivingly connects the driving means to the crankshaft for starting the engine.

BRIEF DESCRIPTION OF THE DRAWINGS

A better understanding of the present invention will be had upon reference to the following specifications and the attached drawings wherein like numerals refer to like parts and wherein.

DETAILED DESCRIPTION OF THE PREFERRED EMBODIMENT

Figure 1:
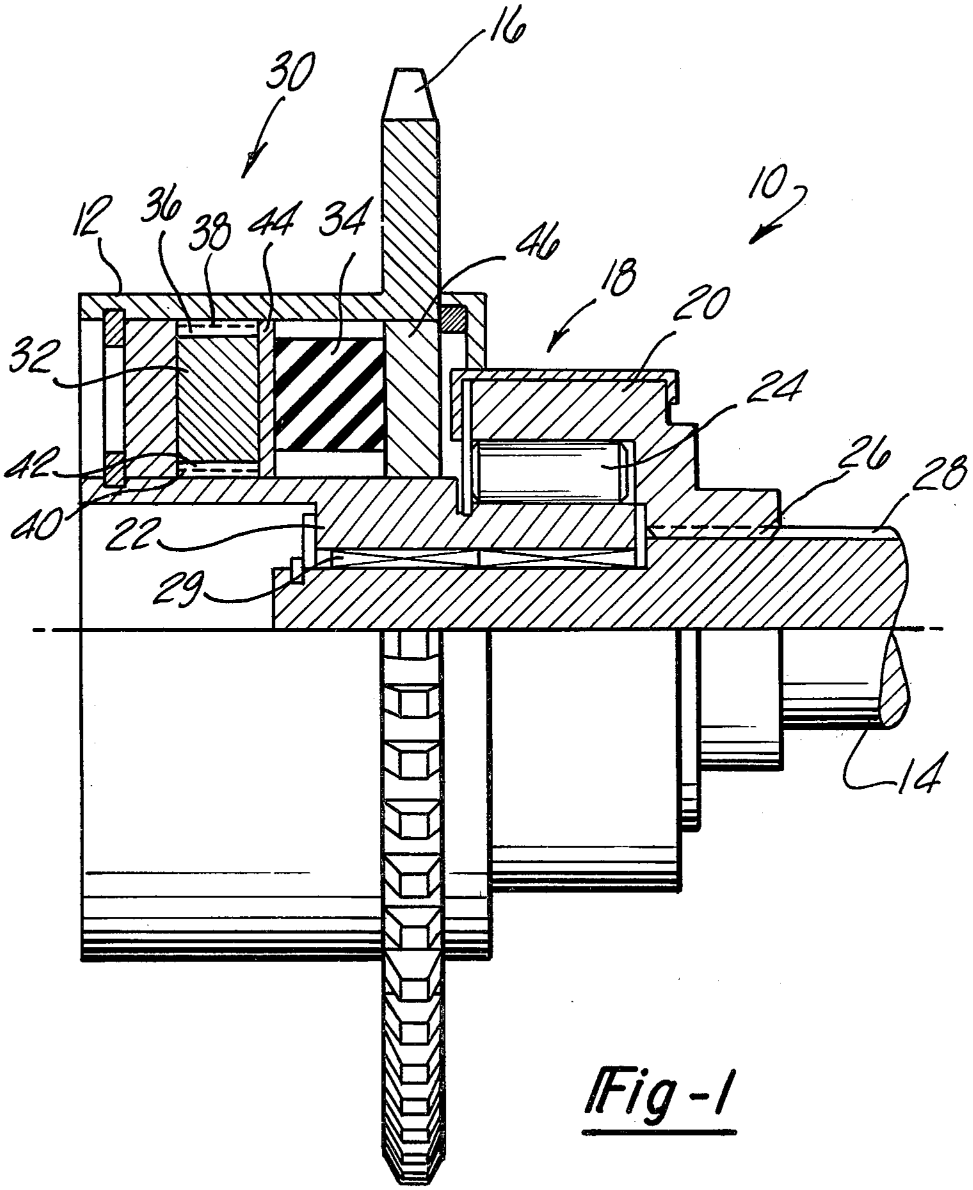
FIG. 1 is a side view, partially in section, showing one advantageous embodiment of the present invention; and, FIG. 2 is a side view, partially in section, showing another advantageous embodiment of the present invention.
Figure 2:
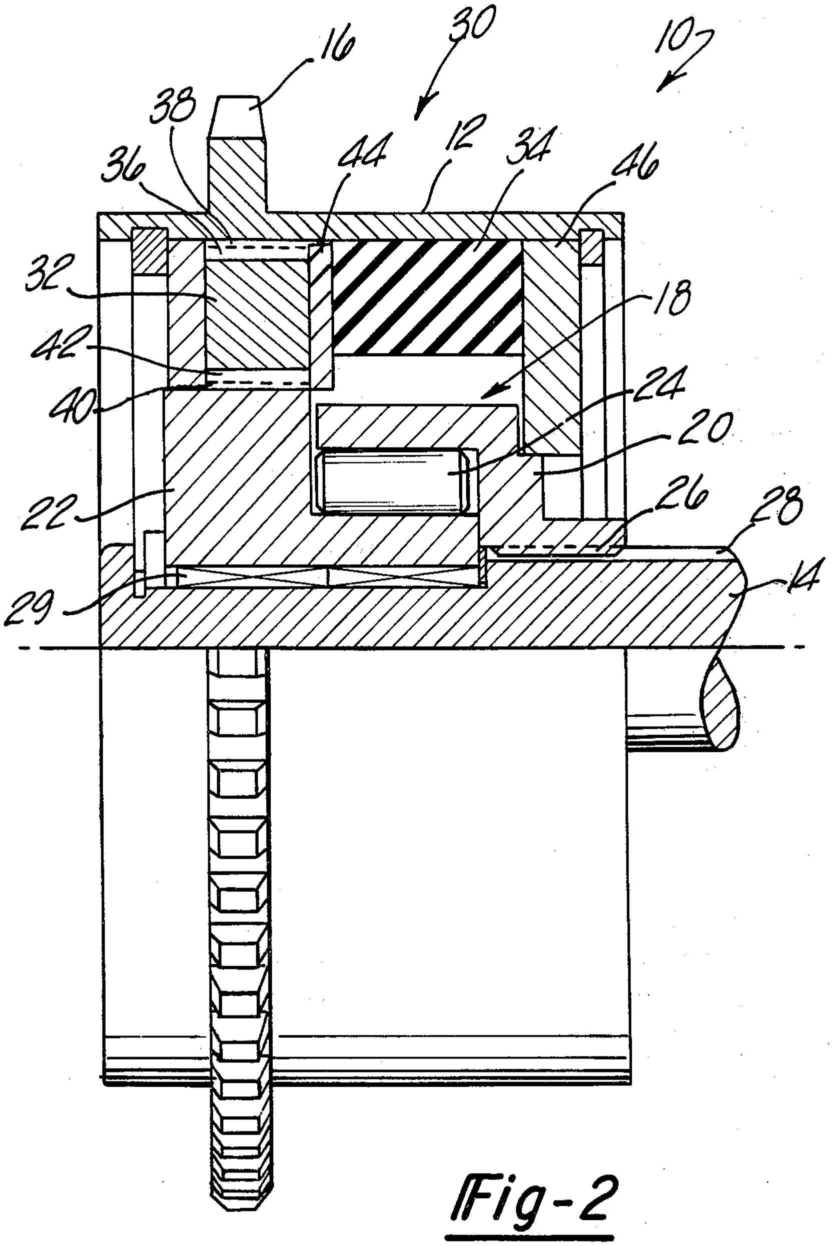

With reference to both FIGS. 1 and 2, there is illustrated a direct cranking starter device, generally denoted as the numeral 10, to interconnect a starting motor (not shown) and an internal combustion engine (not shown) for transferring rotary motion and torque from the starter motor to the engine to start the engine.

The direct cranking starter 10 has driving means 12, for example, a cylindrically shaped body coaxially disposed with the crankshaft 14 of the engine. The cylindrically shaped body 12 has means, such as, for example, chain sprocket teeth 16 projecting radially outwardly, for connection to the starting motor by a chain.

An overrunning roller clutch 18 is coaxially disposed with the crankshaft 14 and comprises a cam body 20 attached to the crankshaft 14 for rotation therewith, a roller race 22 coaxially disposed with the cam body 20 and roller bearings 24 between the cam body 20 and roller race 22. The cam body 20 can be connected to the crankshaft 14 by virtually any conventional or otherwise convenient means, for example, a spine tooth 26 received in an appropriate slot 28 in the crankshaft 14. Bearings 29 are disposed between the roller race 22 and the crankshaft 14 providing support for the roller race 22 while also allowing the crankshaft 14 and the roller race 22 to rotate relative to one another.

The direct cranking starter 10 also comprises means 30 for interconnecting the driving means 12 and the overrunning clutch 18, and for preventing initial starting torque intermittent shock loads from being transmitted from the driving means 12 to the overrunning clutch 18 as the starting motor initially rotates the driving means 12. The means 30 interconnecting the driving means and overrunning clutch is comprised of a ring member 32 coaxially disposed with the crankshaft 14 interior to the cylindrical body of the driving means 12 connecting the driving means 12 to the bearing race 22 and which is movable axially of the crankshaft 14 upon initial rotation of the driving means 12. Resilient means, for example, an annular body 34 of resilient material is adjacently disposed to the ring member 32 axially of the crankshaft so that as the ring member 32 moves axially of the crankshaft it will come into abutment with the resilient annular body 34 whereupon the resilient annular body absorbs the initial starting torque shock load preventing these shock loads from being transmitted to the overrunning clutch 18.

The ring member 32 is connected to the cylindrical body of the driving means 12 by means of, for example, mating helical splines 36, 38. The helical splines 36 are formed on the inner circumferential surface of the cylindrical body of the driving means 12 and the helical splines 38 are formed on the peripheral surface of the ring member 32. These helical splines 36, 38 are twisted in a direction counter to the rotational direction of the driving means 12 upon activation of the starting motor so that they will cause the ring member 32 to move against the resilient means 34. For example, if the driving means 12 is to be rotated clock-wise by the starter, then the helical splines 36, 38 will have a counter-clockwise twist. Similarly, the ring member 32 is connected to the bearing race 22 of the overrunning clutch 18 by means of, for example, mating helical splines 40, 42. The helical splines 40 are formed in the inner circumferential surface of the ring member 32 and the helical splines 42 are formed in the peripheral surface of the bearing race 22. The helical splines 40, 42 are twisted oppositely of the splines 36, 38. For example, if the splines 36, 38 have a counter-clockwise twist, the splines 40, 42 have a clockwise twist.

Further, a thrust washer 44 is disposed between the ring member 32 and resilient annular body 34. The ring member 32 is held in place on the cylindrical body of the driving means 12 against axial displacement by a retaining ring member 46 disposed in abutting relationship to the resilient annular body 34 on the opposite side thereof from the thrust washer 44.

In operation, the starter is activated causing the driving means 12 to rotate about an axis concentric with the crankshaft 14. The ring member 32 concurrently rotates with the driving means 12 and moves axially of the crankshaft 14 and against the resilient annular body 34 due to the coaction of the helical splines 36, 38. The resilient annular body 34 absorbs the initial starting torque shock being transmitted to the ring member 32 through the driving means 12 from the starter. Simultaneously, the ring member 32 causes the roller race 22 of the overrunning clutch 18 to rotate in the same direction as the driving means 12 due to the coaction of the helical splines 40, 42. As the roller race 22 begins to rotate, the roller bearings 24 coact with the cam body 20 of the overrunning clutch, thus, causing the cam body 20 and the crankshaft 14, connected to the cam body, to also rotate in the same direction as the driving means. As the engine fires and starts to run on its own, the crankshaft 14, and the cam body 20 of the overrunning clutch which is attached to the crankshaft, will rotate at a faster speed than the roller race 22 causing the roller bearings 24 to disengage from the cam body.

The foregoing detailed description is given primarily for clearness of understanding and no unnecessary limitations should be understood therefrom for modifications will become obvious to those skilled in the art upon reading this disclosure and may be made without departing from the invention or the scope of the appended claims.

What is claimed is:

1. A starter drive device to interconnect a starting motor and the crankshaft of an internal combustion engine for starting the internal combustion engine, said starter drive device comprising:

driving means to be operating connected to the starting motor and to be rotatably driven by the starting motor;

an overrunning clutch mounted coaxial with said driving means, said overrunning clutch comprising:

a cam body connected to said crankshaft of the engine for rotation therewith;

a bearing race mounted coaxial with said cam body, said bearing race having one end portion and an opposite end portion, said one end portion mounted to said crankshaft intermediate said cam body and said crankshaft; and means for bearing disposed between said cam body and said first portion of the bearing race, said bearing means interconnecting said cam body and said first portion of the bearing race to selectively engage said cam body to said bearing race when said internal combustion engine is operated below a predetermined speed;

means interconnecting said driving means and said overrunning clutch interposed said driving means and said overrunning clutch for communicating the rotatable movement of said driving means to said crankshaft of the engine, said interconnecting means further comprising:

a ring member coaxially disposed with said crankshaft of the engine, said ring member interconnecting said driving means and said opposite end portion of the bearing race, said ring member being axially and rotatably movable with respect to said crankshaft; and resilient means disposed adjacent to said ring member and coaxial with said crankshaft such that as said ring member moves axially upon rotation of said driving means said ring member abuts said resilient means whereby said resilient means absorbs the starting torque shock loads and subsequent rebound action of the crankshaft generated by the rotation of the crankshaft of the engine by the driving means.

2. The starter device of claim 1, wherein:

(a) said driving means comprises:

a cylindrical body coaxially disposed with the engine crankshaft; and, means for connecting said cylindrical body to the starting motor;

(b) said overrunning clutch is disposed within said cylindrical body of said driving means and is coaxially disposed with the engine crankshaft and said cylindrical body; and, (c) said ring member is disposed within said cylindrical body of said driving means between said overrunning clutch and said cylindrical body.

3. The starter drive device according to claim 1 further comprising:

means for operatively connecting said cam body to said crankshaft; and means for operatively connecting said interconnecting means to said driving means and said bearing race.

4. The starter drive device of claim 1, wherein said ring member is interconnected to said driving means by helical splines and said ring member is interconnected to said bearing race by helical splines twisted oppositely of those interconnecting said driving means and ring member.

5. The starter drive of claim 4, wherein said helical splines interconnecting said ring member and driving means are twisted in a direction counter to the rotational direction of said driving means upon activation of the starting motor for starting the internal combustion engine.

6. The starter drive device of claim 1, wherein said resilient means comprises an annular body of resilient material attached to said driving means for rotation therewith.

7. The starter drive device of claim 4, wherein said resilient means further comprises a thrust washer disposed between said annular body and said ring member.

8. The starter device of claim 7 wherein said resilient means further comprises a retaining ring member attached to said driving means and disposed in abutting relationship to said annular body on the opposite side thereof from said thrust washer for holding said annular body in position.

* * * * *